US010541808B2

(12) United States Patent
Samid

(10) Patent No.: US 10,541,808 B2
(45) Date of Patent: Jan. 21, 2020

(54) ADVANCED BITFLIP: THREAT-ADJUSTED, QUANTUM-READY, BATTERY-FRIENDLY, APPLICATION-RICH CIPHER

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 16/253,911

(22) Filed: Jan. 22, 2019

(65) Prior Publication Data

US 2019/0229894 A1 Jul. 25, 2019

Related U.S. Application Data

(60) Provisional application No. 62/619,854, filed on Jan. 21, 2018.

(51) Int. Cl.
*H04L 29/06* (2006.01)
*H04L 9/08* (2006.01)
*H04L 9/32* (2006.01)
*H04L 9/06* (2006.01)

(52) U.S. Cl.
CPC ............ *H04L 9/0656* (2013.01); *H04L 9/085* (2013.01); *H04L 9/0852* (2013.01); *H04L 9/3271* (2013.01)

(58) Field of Classification Search
CPC ..... H04L 9/0656; H04L 9/085; H04L 9/0852; H04L 9/3271
See application file for complete search history.

(56) References Cited

U.S. PATENT DOCUMENTS

2013/0243187 A1* 9/2013 Horstmeyer .......... H04L 9/0656
380/28
2015/0120706 A1* 4/2015 Hoffman ............... G06N 3/0445
707/722
2016/0019386 A1* 1/2016 Duplys .................. G06F 21/55
713/191
2016/0189325 A1* 6/2016 Zhou ....................... G06T 1/005
380/28
2017/0250796 A1* 8/2017 Samid ................... H04L 9/0838

OTHER PUBLICATIONS

Power Analysis of the Advanced Encryption Standard: Attacks and Countermeasures for 8-bit Microcontrollers; M Fransson—2015—diva-portal.org; pp. 1-93.*

* cited by examiner

*Primary Examiner* — Mohammad A Siddiqi

(57) ABSTRACT

Generally ciphers project a fixed measure of security, defined by the complexity of their algorithms. Alas, threat is variable, and should be met with matching security. It is useless to project insufficient security, and it is wasteful and burdensome to over-secure data. Advanced BitFlip comes with threat-adjustable flexibility, established via: (i) smart decoy strategy, (ii) parallel encryption, (iii) uniform letter frequency adjustment—tools which enable the BitFlip user to (a) adjust its ciphertexts to match the appraised threat, and (b) sustain security levels for aging keys. The use of these threat-adjusting tools may be automated to allow (1) AI engines to enhance the security service of the cipher, and (2) to enable remote hard-to-access IoT devices to keep aging keys useful, and preserve precious energy by matching security to the ad-hoc threat level. BitFlip may also be operated in a zero-leakage mode where no attributes of a conversation are disclosed, up to full steganographic levels. BitFlip security is two-dimensional: intractability and equivocation, both may be conveniently increased to meet quantum cryptanalytic attacks.

2 Claims, 10 Drawing Sheets

Transmission Functions

Fig. 1: Letter Frequency Defense Mode
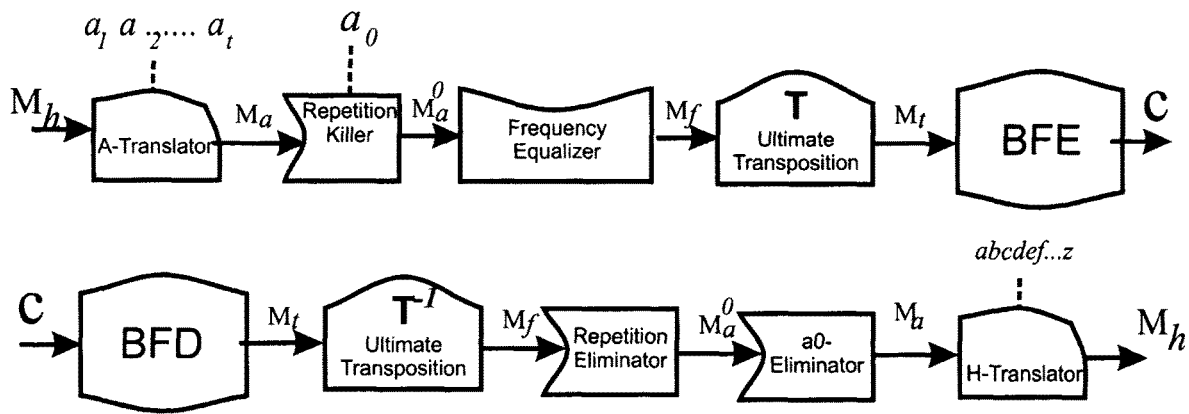

Fig.-2 BitFlip Message Size Distribution
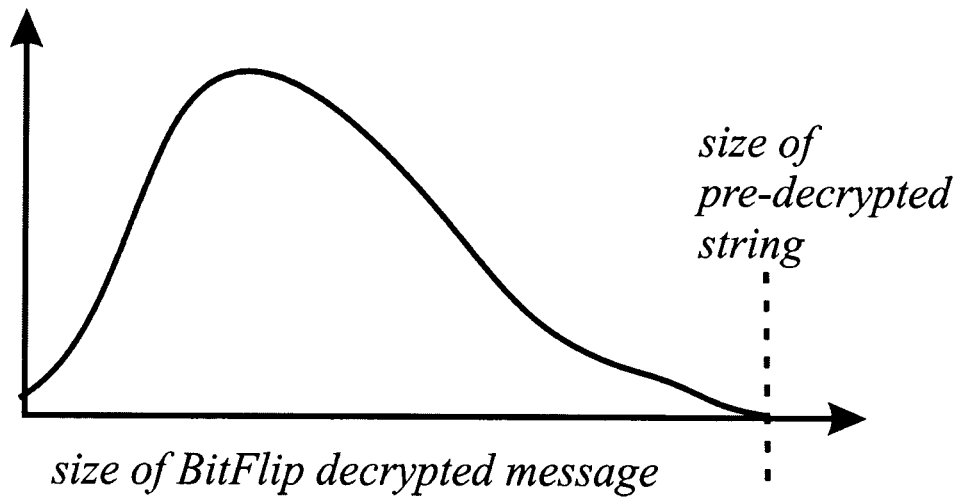

Fig.-3: The BitFlip Communication Architecture:.
The BitFlip Communication Architecture
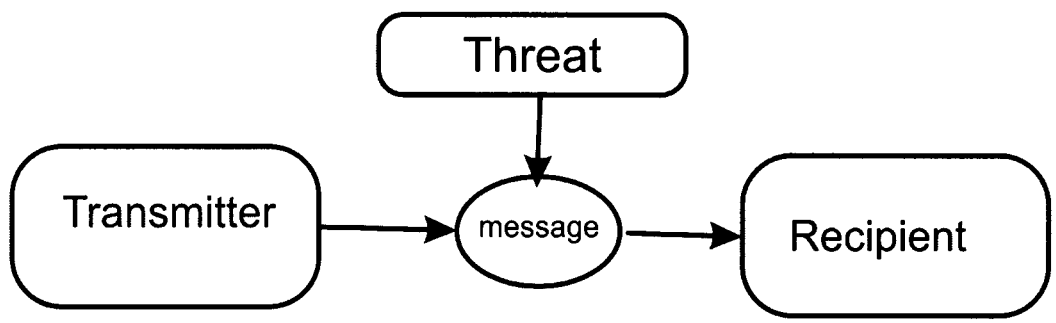
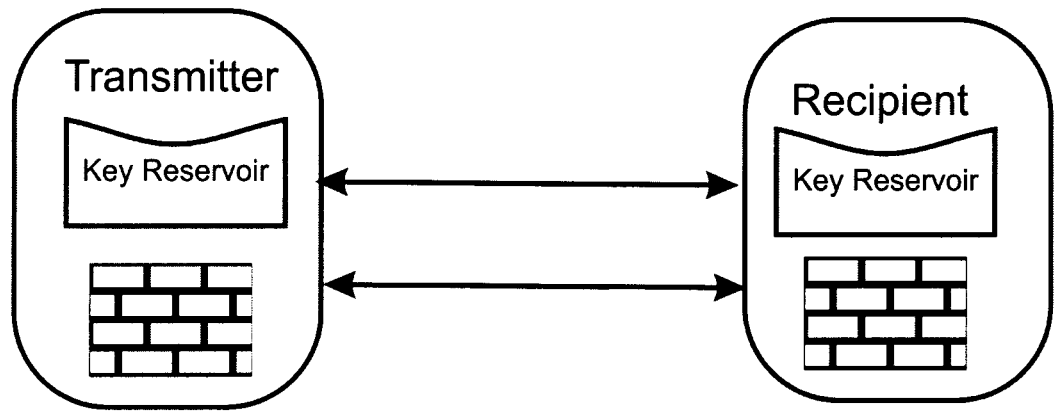

Fig.-4: Transmission Functions:
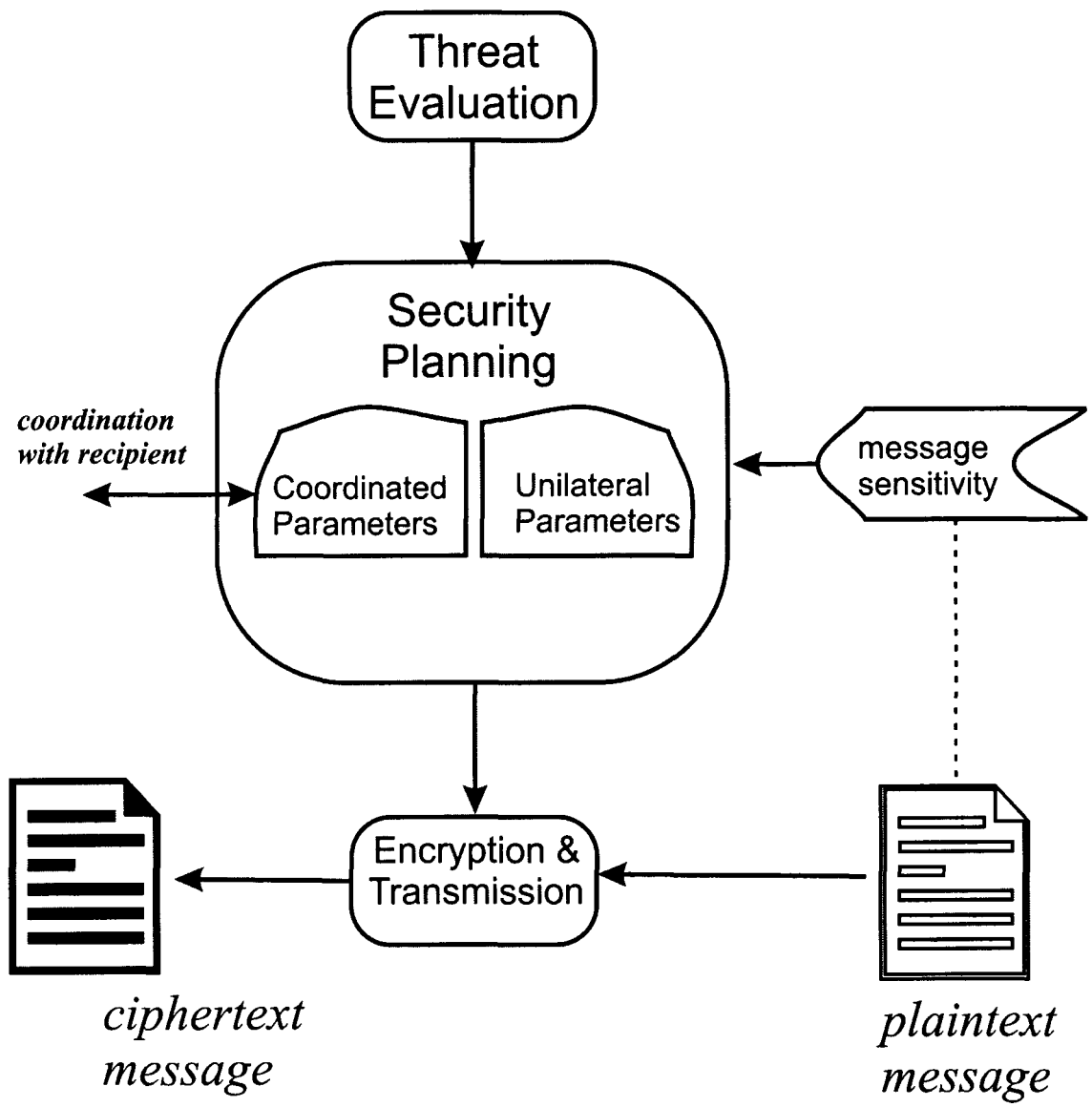

Fig.-5: Planning Coordinated Parameters:
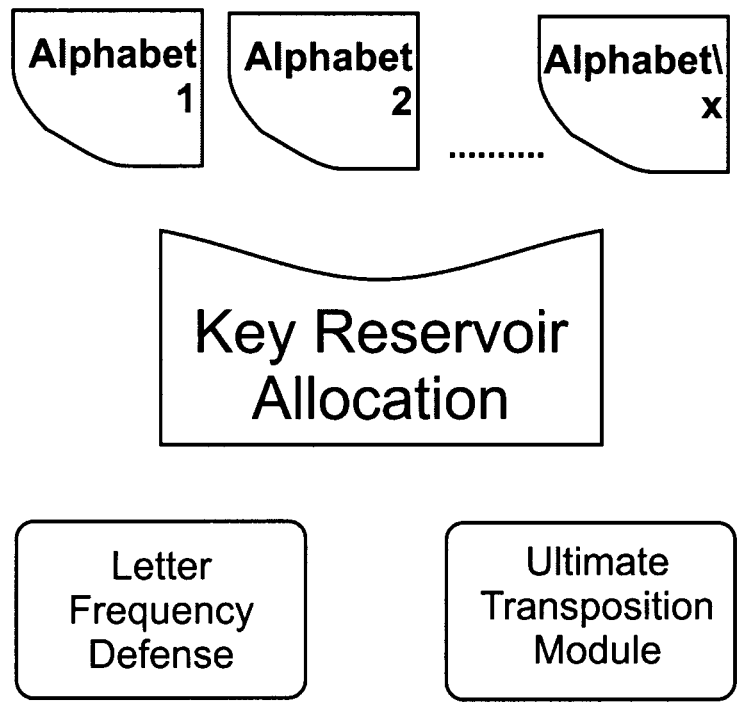

Fig.-6: Universal Security Planning and Encryption:
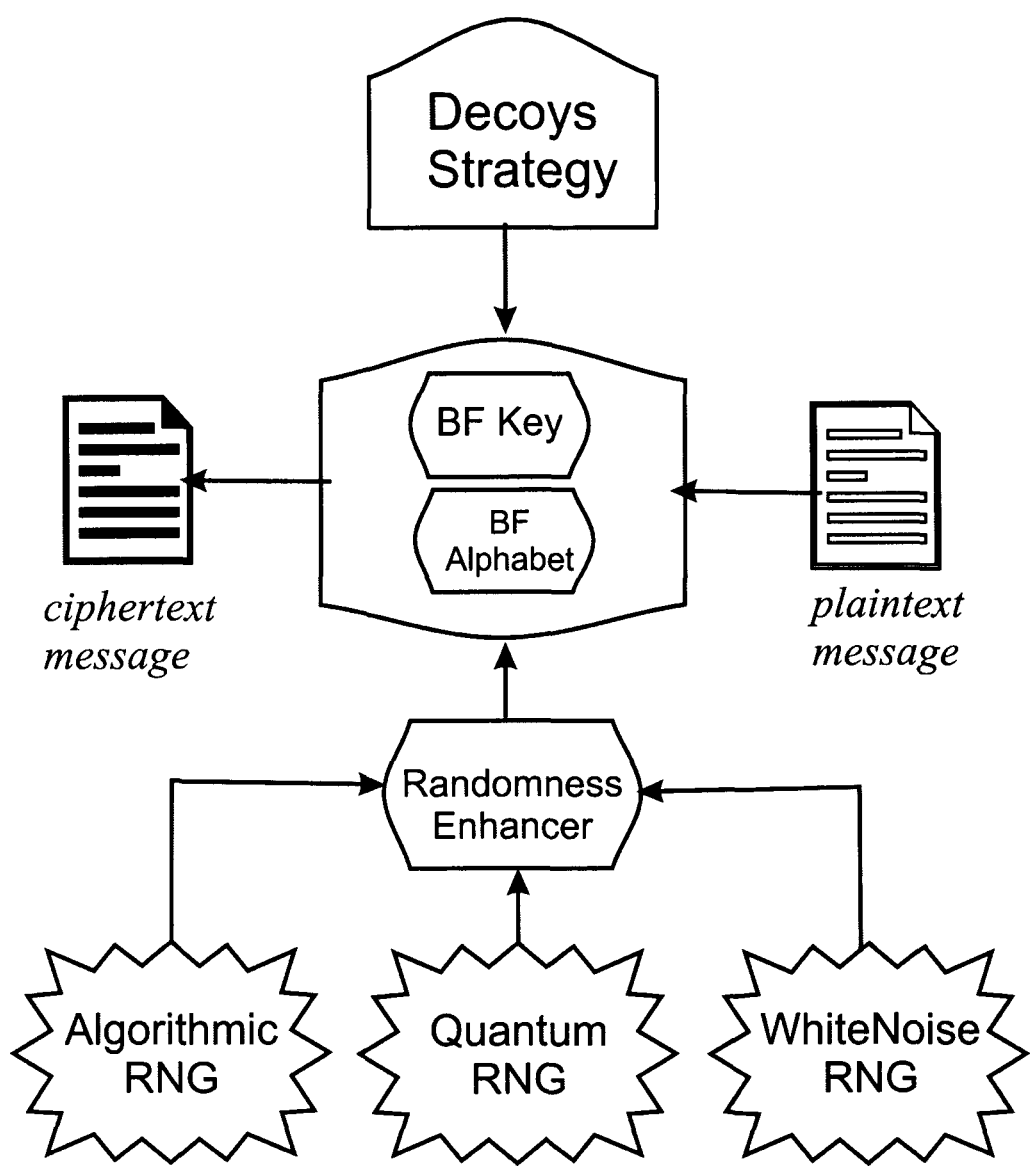

Fig.-7: BitFlip Decryption:
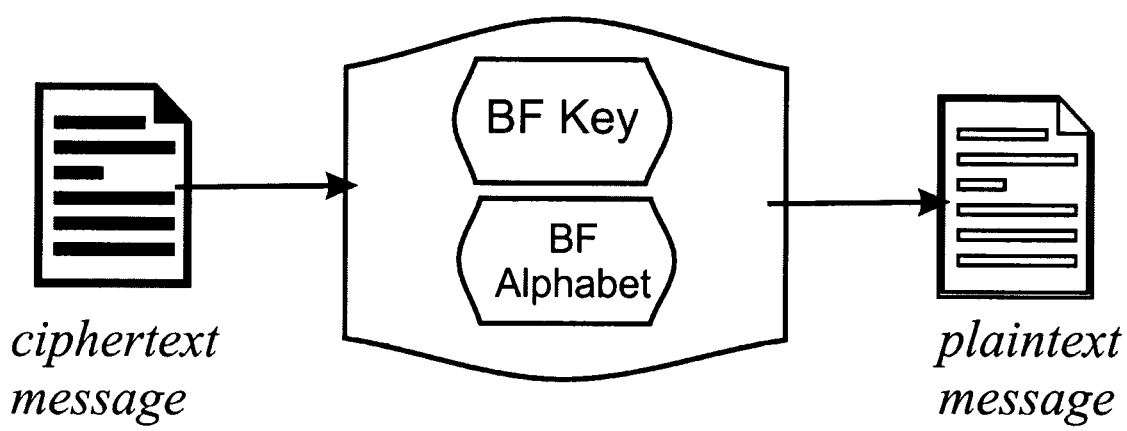

Fig.-8: BitFlip Message Dilution and Message Security Trade-Off:.
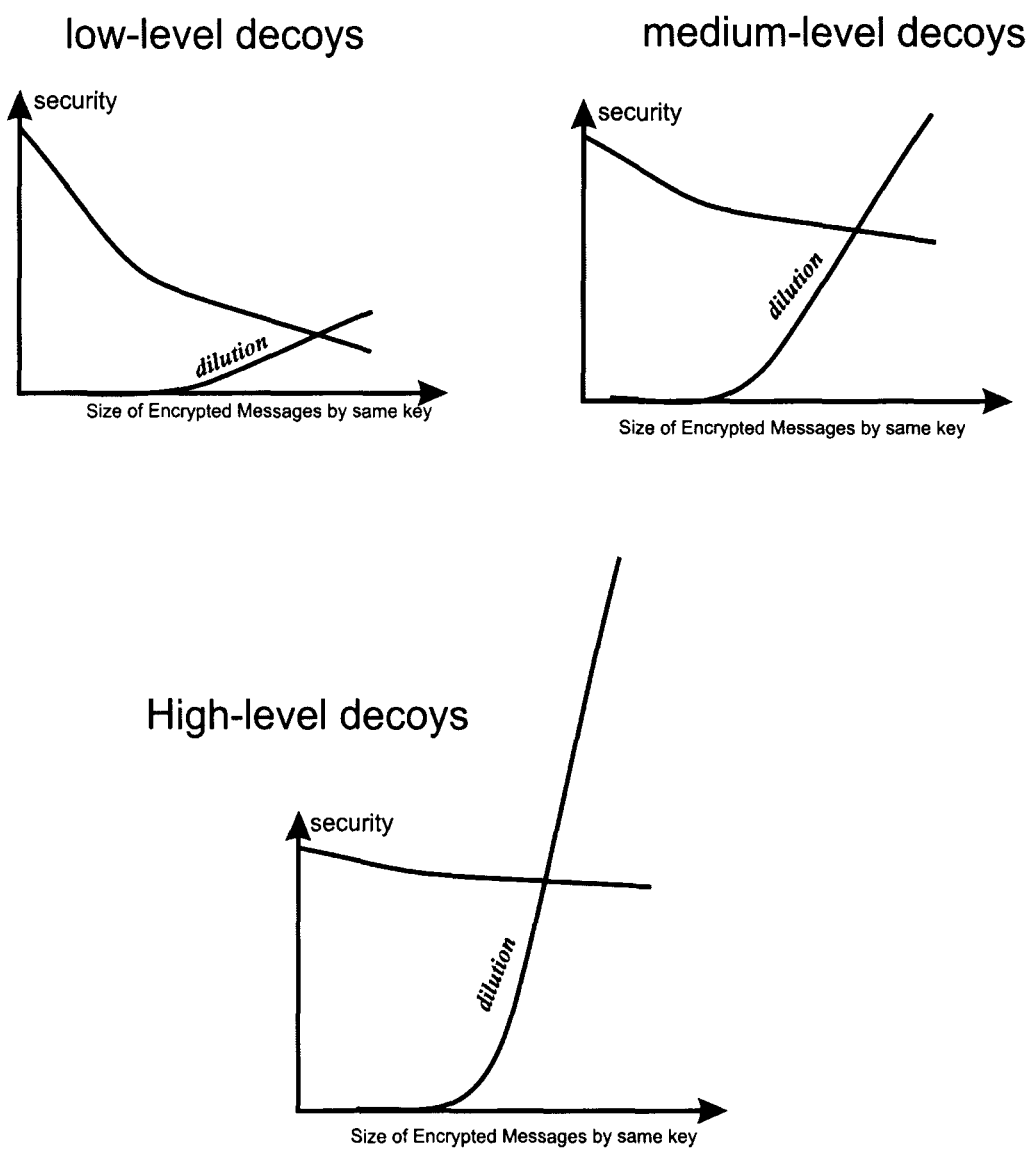

Fig.-9 BitFlip Key Switching:
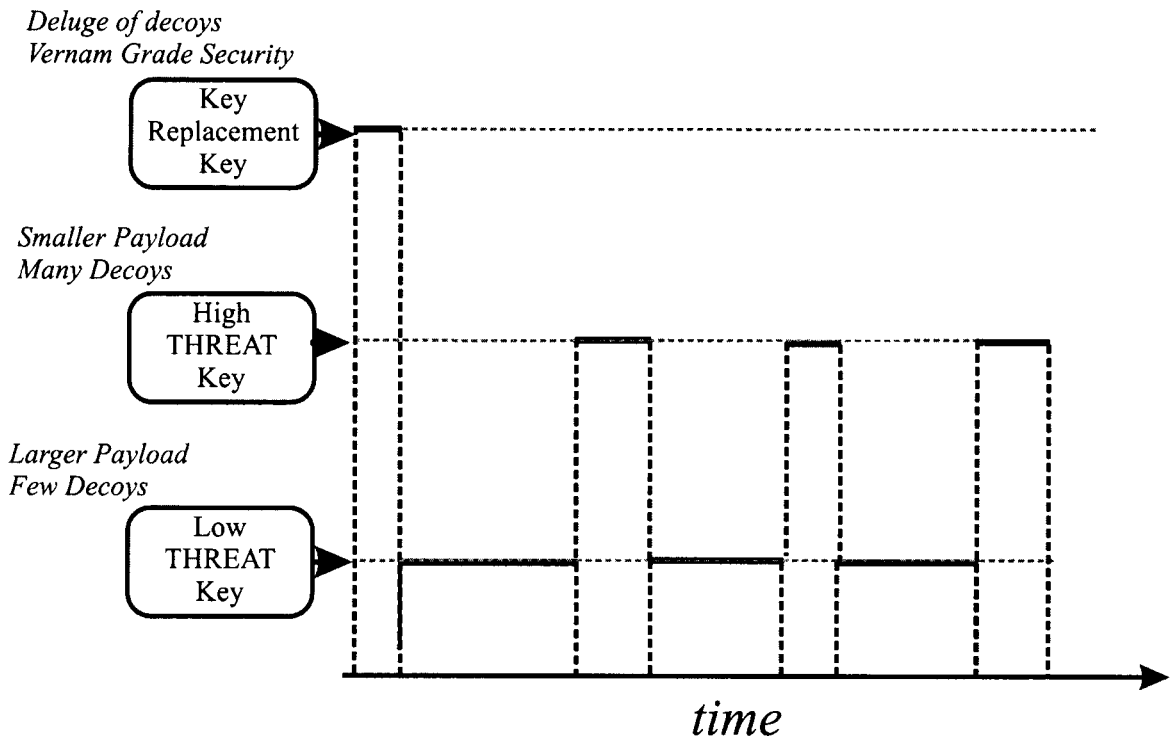

Fig.-10 BitFlip Zero Leakage Mode:
BitFlip Zero-Leakage Mode
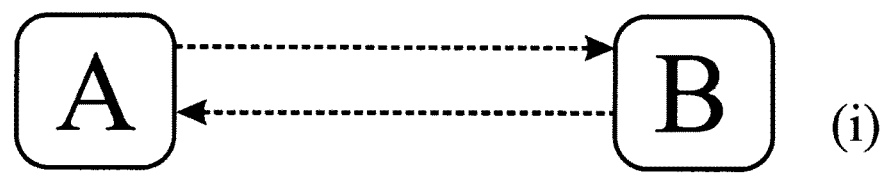
(i)
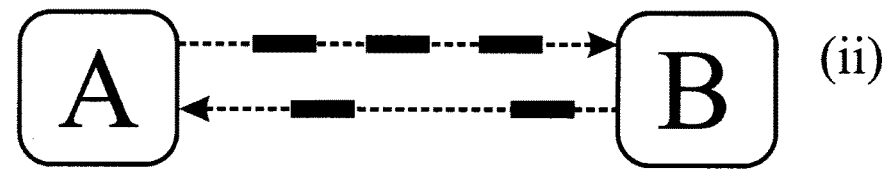
(ii)
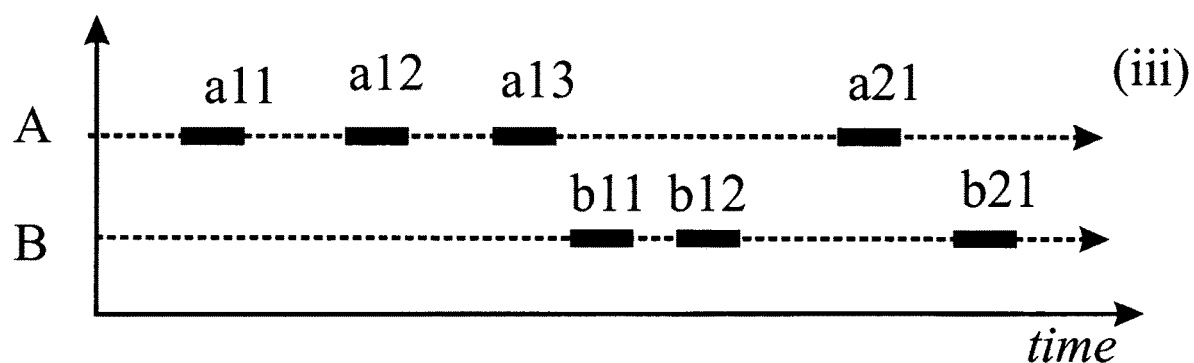
(iii)

ADVANCED BITFLIP: THREAT-ADJUSTED, QUANTUM-READY, BATTERY-FRIENDLY, APPLICATION-RICH CIPHER

Generally ciphers project a fixed measure of security, defined by the complexity of their algorithms. Alas, threat is variable, and should be met with matching security. It is useless to project insufficient security, and it is wasteful and burdensome to over-secure data. Advanced BitFlip comes with threat-adjustable flexibility, established via: (i) smart decoy strategy, (ii) parallel encryption, (iii) uniform letter frequency adjustment—tools which enable the BitFlip user to (a) adjust its ciphertexts to match the appraised threat, and (b) sustain security levels for aging keys. The use of these threat-adjusting tools may be automated to allow (1) AI engines to enhance the security service of the cipher, and (2) to enable remote hard-to-access IoT devices to keep aging keys useful, and preserve precious energy by matching security to the ad-hoc threat level. BitFlip may also be operated in a zero-leakage mode where no attributes of a conversation are disclosed, up to full steganographic levels. BitFlip security is two-dimensional: intractability and equivocation, both may be conveniently increased to meet quantum cryptanalytic attacks.

BRIEF EXPLANATION OF DRAWINGS

FIG. 1: Letter Frequency Defense Mode

Legend: The figure shows two counter-parallel operation: encryption and decryption. The upper sequence depicts the humanly readable plaintext message $M_h$ (written in English or any other human language), as it is served as input into the A-Translator, which translates $M_h$ to the same message, only expressed in the BitFlip alphabet A: $a_1, s_2, \ldots a_t$. The result is the A alphabet expression of the same plaintext message: $M_a$. $M_a$ is forwarded into the "Repetition Killer" wherein a previously unused letter $a_0$ is being interjected between every two repeating letters. The result is the $M^o_a$ plaintext message, now written with letters $a_0, a_1, \ldots a_t$. $M^o_a$ is characterized as having no repetition. $M^o_a$ is forwarded to the Frequency Equalizer, that injects repetition such that all the letters in the A alphabet appear with the same frequency. The result is the new form of the plaintext message, $M_f$. $M_f$ is forwarded to the T-Ultimate Transposition mode that creates as an output one of the full factorial range of permutations of $M_f$. The resultant permutation is called $M_r$. $M_t$ is then forwarded to the BitFlip Encryption module, (BFE), where the ciphertext c is generated using any decoy strategy of choice.

In the lower part of the figure, we see the reverse. The ciphertext c generated above is fed into the BitFlip decryption module to extract $M_t$, which in turn is fed into the reverse transposition module $T^{-1}$, from where the reverse-transpose plaintext message $M_f$ is emerging. $M_f$ is forwarded to the Repetition Eliminator which simply reduces any letter repetition to a single letter: $M^o_a$. $M^o_a$ is fed into the $M^o_a$-Eliminator, which simply plucks out all the $a_0$ letters to generate $M_a$, which is finally reverse expressed in the human alphabet $M_h$.

FIG. 2 BitFlip Message Size Distribution The figure shows how a given arbitrary bit string of size R will decrypt to a set of plaintext messages between the size of zero to R, depending on the selected key.

FIG. 3: The BitFlip Communication Architecture: The upper part of this figure depicts the main entities in the BitFlip environment: the transmitter, the recipient, the transferred message, and the threat. The lower part depicts the fact that both the transmitter and the recipient share a key-reservoir, one or more alphabets, and a set of operational primitives.

FIG. 4: Transmission Functions: This figure depicts the transmission sequence that begins with evaluating the sensitivity of the message to be encrypted along with evaluation of the threat to be met. These evaluation (algorithmic or manual) will result in determining (i) unilateral parameters, set up by the transmitter without pre coordination with the recipient, e.g decoy strategy, and (ii) coordinated parameters which are agreed upon with the recipient. These parameters then determine the exact encryption and transmission process.

FIG. 5: Planning Coordinated Parameters: This figure depicts the coordinated factors: a set of BitFlip alphabets, the key reservoir, and computational primitives, mainly the letter frequency defense and the ultimate transposition module.

FIG. 6: Universal Security Planning and Encryption: This figure depicts the process where a plaintext message is encrypted to its ciphertext via the BitFlip encryption module comprised of the BitFlip key and the BitFlip alphabet of choice. The module is guided by the decoy strategy that is set to meet the prevailing threat. The encryption takes place via the high quality ad-hoc randomness apparatus. It is depicted as having three optional sources: algorithmic randomness, white noise randomness and quantum randomness. The generated randomness is processed via a randomness enhancer [Samid 2017C].

FIG. 7: BitFlip Decryption: the figure depicts a ciphertext processed via the BitFlip decryption module where the BitFlip key operates on the selected alphabet to generate the plaintext.

FIG. 8: BitFlip Message Dilution and Message Security Trade-Off: This figure shows how with increased dilution the security remains high despite a growing size of cumulative message encryption.

FIG. 9 BitFlip Key Switching: This figure depicts how over time the transmitter switches between keys to provide matching security to data of different security requirements, where the highest security is reserved for replacing key material for lower security communication.

FIG. 10 BitFlip Zero Leakage Mode: the upper part (i) depicts the no communication mode, which nonetheless is denying an eavesdropper any clue whether information is exchanged or only random bits flow back and forth. Part (ii) depicts how the two counter flows are peppered with contents both ways. Part (iii) depicts a timeline for a conversation. Party A sends message a1 comprised of letters a11, a12, a13 to B. Party B responds with message b1 comprised of letters b11 and b12. To which party A responds with a2, comprised of one letter a21. Party B, in turn responds with message b2 comprised of letter b21.

DETAILED DESCRIPTION OF THE INVENTION

Introduction

BitFlip is a modern cipher representing an alternative crypto strategy, which generates security through lavish use of high quality randomness, as opposed to constructing ever more complex computational puzzles to frustrate the cryptanalyst. Intractability-complexity algorithms offer a fixed measure of security, and so by definition they over-encrypt against a low threat, and under-encrypt against a high threat, ("dumb ciphers"). Making them wasteful and burdensome for the first case, and useless for the latter. By contrast randomness-based ciphers, ('smart ciphers'), generally can adjust the security they project by adjusting the amount of randomness they employ, and by deploying various procedures that provide added security.

The fundamental reason for this distinction of BitFlip (as applied to most others randomness-rich ciphers) is that this class of ciphers protects its data payload with two security concepts, rather than the customary one. Regular ciphers generate security through mathematical intractability—the assumed difficulty to compute the reverse-encrypt algorithm. This, generally unproven, intractability has a finite lifetime beyond which it surrenders to faster computers and smarter math. BitFlip and its ilk challenge the intractability-resolving cryptanalyst with a second security fence: equivocation, the built in indeterminism which one of two or more plausible messages was encrypted into the ciphertext. Bit-Flip like other randomness rich ciphers may adjust this level of equivocation and hence adjust the level of de-facto security.

These features renders BitFlip into a smart cipher that can be well managed by an AI engine to dynamically meet the appraised threat head-on and efficiently.

In this presentation we shall (i) present the 'naive mode' for operation BitFlip, then (ii) present how to adjust security to threat level, and (iii) how to extract indefinite amount of security from an aging cipher key.

The 'Naïve' Mode

The basic BitFlip is a polyalphabetic cipher described in [Samid, Popov 2017]. It operates on plaintext messages written in letters drawn from alphabet A: $\{a_1, a_2, \ldots a_t\}$ comprised of t letters. Each letter, $a_i$, is associated with a unique "letter key", $k_i$: an n-bits bit string: $a_i \to k_i$ for $i=1, 2, \ldots t$. And is also associated with a positive integer $f_i$ (associated with $a_i$), called 'flip ratio', where $0 \leq f_i \leq n$ for $i=1, 2, \ldots t$. (The basic BitFlip operated with a fixed flip ratio $f=n/2$).

The t letter keys and the t flip ratios comprise the secret BitFlip key, K.

The BitFlip cipher may be viewed as a forward function associating an input bit string called 'plaintext message' m, and an output bit string called a 'ciphertext', c:

$$c=BFE(m,K); m=BFD(c,K)$$

Where BFE and BFD stand for BitFlip encryption and BitFlip decryption respectively.

BitFlip may be implemented in a naive mode, and advanced mode.

BitFlip Naive Mode:

The plaintext M is comprised of a string of letters drawn from the alphabet A:

$$M=m_1\|m_2\|\ldots\|m_q, \text{ where } m_i \in A, \text{ for } i=1,2,\ldots q$$

The ciphertext C is comprised of qn bits, where q is the number of letters in M. The q n-bits long substrings are marked by order $c_1, c_2, \ldots c_q$:

$$C=c_1\|c_2\|\ldots\|c_q$$

The BitFlip cipher associates $m_i$ with $c_i$ for $i=1, 2, \ldots q$.

The association is defined through the "BitFlip Encryption Rules":

$$a_j=I(m_i) \qquad (i)$$

$$H(c_i,k_j)=f_j \qquad (ii)$$

$$H(c_i,k_l) \neq f_l \ldots \text{ for all } l \neq j \qquad (iii)$$

where $a_j=I(m_i)$ is the identity function that identifies $m_i$ as a particular letter $a_j \in A$ indicated by $m_i$. And where $H(x,y)$ is the Hamming distance between two equal size bit strings x and y.

It is clear from this definition that the BitFlip function is not a bijection. While every $c_i$ points to no more than a single $m_i$, the reverse is not true. Every $m_i$ may be encrypted to $$\theta_i = n!/f_i!(n-f_i)! - \lambda_i$$

distinct $c_i$, where $\lambda_i$ reflects the strings that fail the inequality part of the BitFlip definition. (i=1, 2, ... q). It is this gross asymmetry that gives BitFlip its power.

The value of $\theta_i$ is maximized for $f_i=n/2$, and minimized for $f_i=0$, or $f_i=n$. One would tend then to choose flip ratios close to n/2, to maximize the resultant equivocation by opting to satisfy:

$$\frac{1}{t}\sum_{i=1}^{i=t} f_i = \frac{n}{2}$$

The BitFlip transmitter of m will encrypt m letter by letter. For each $m_i$, the transmitter would identify $a_j=I(m_i)$, then it would select any of the $\theta_j$ substrings as $c_i$, and so on, for $i=1, 2, \ldots q$. The resultant $c_i$ strings will be concatenated to form the ciphertext c which is transmitted to the intended recipient.

The intended recipient of the message will break c to its substrings: $c=c_1\|c_2\|\ldots\|c_q$ and for each $c_i$, it will rotate through the letters in A to find $m_i$ according to the BitFlip Encryption Rules The cryptanalyst is assumed to know everything about BitFlip except the value of the key, K, namely the identities of the strings $k_1, k_2, \ldots k_t$ and $f_1, f_2 \ldots f_t$.

To cryptanalyze the message m from c, the cryptanalyst will have to either write a system of multi-variate equations expressing the knowledge of c, or "brute force" test all the possible key values, and check for each such value whether c will evaluate into a valid m. There are $(n+\log(n))^t$ bits to identify. The q multi-variate equations express (n+2)t string variables, accounting for flip ratios and the letter-identity function. The nature of the BitFlip Encryption Rules impose a formidable complexity on the algebraic approach because of how polyalphabetic BitFlip is, and because of the inequality condition. In particular, the letter identity function $a_j=I(m_i)$ represents a t! variety. Namely, any key $\{k_1, k_2, \ldots k_t, f_1, f_2 \ldots f_t\}$ will reflect t! distinct mapping of c to m.

On the other hand, trying all keys appears open ended. Today AES is considered secure because to test all possible $2^{128}$ key options for the smallest size key is considered out of reach. Much more so for keys comprised of 256 bits or higher. AES, being complexity-based cannot readily increase its key size because it will slow its operation too much. By contrast, a normal BitFlip cipher operating with Hex (16 letters, t=16), and key size n=256 bits will be comprised of $(n+\log(n))t=(256+8)16=4224$ bits—an order of magnitude higher. Any mapping of c to an m will have correlated $t!=16!=2*10^{23}$ keys, representing the t! permutations between the key strings $k_1, k_2, \ldots k_t$ and $a_1, a_2, \ldots a_t$. So either the algebraic attack, or the brute force key testing attack may be made prohibitively intractable. And what's more, BitFlip processing is linear with the size of the key letter, n, which will allow its user to increase the size of the key without any meaningful increased computational burden.

The above cryptanalysis refers to the standard 'known ciphertext' attack. Being a polynomial alphabet BitFlip is inherently vulnerable to 'chosen plaintext attack'. In the 'naive mode' such an attack will encrypt any letter repeatedly. After α times, encrypting $a_i$, the attacker will posses α n-bits strings, and be able to write a equations: $f_j = H(c_j, k_i)$, where j=1, 2, ... α and for a sufficiently large α, the attacker will be able to solve for $f_i$ and $k_i$ for all i values. This is the Achilles Heel of the BitFlip cipher. One would be careful with this 'naive mode' in a situation where the attacker may launch such a 'chosen plaintext' attack'. This vulnerability is the impetus for the non-naive modes discussed ahead.

The underlying premise of the BitFlip cipher is that there is no mathematical short-cut more efficient than the above-described options to cracking the BitFlip cipher.

It figures then that the BitFlip user, controlling the values of n and t will control the computational intractability defense for this cipher.

The BitFlip Arbitrary Decryption Theorem:

Given an arbitrary bit string (length, and content), R, there exists a BitFlip key, K, that decrypts R into a non-empty plaintext message m written with a given alphabet A.

Proof:

Let $f_i$ be a non-negative integer where $0 \le f_1 \le r$, where r=|R| the size of R. Let S be any string such that $H(S,R)=f_1$. Namely S logs a Hamming distance of $f_1$ from R. Let $k_1$=S. Let $k_i$ be an arbitrary string such that $k_i \ne k_1$ for i=2, 3, ... t. Let $f_i$ for i=2, 3, ... t be any non-negative integer such that: $0 \le f_i \le n$, and such that $H(k_i, S) \ne f_i$. This fully defines a BitFlip key, $K^1$, which decrypts R to $a_1$. We can now calculate the respective key space $|K^1|$. The number of possible S strings is combinatorially determined to be $n!/(f_1!(n-f_1)!)$. For all other (t−1) letters in A, every combination of the total of $2^n$ strings will do, except the $n!/(f_1!(n-f_1)!)$ strings for which $H(S,k_j)=f_1$, j=2, 3, ... t. We further account for the fact that $f_1$ can vary from 0 to n, and all other flip ratios can also vary from 0 to n, except for the $f_i$ value that represents the Hamming distance between the chosen $k_i$ and S. Furthermore, for all those combinations there are t! possible assignments of the letters keys to specific keys in A, therefore we can write:

$$|K^1(n)| = t! n(n-1)^{t-1} \sum_{f_1=0}^{f_1=n} \frac{n!}{f_1!(n-f_1)!} \left(2^n - \frac{n!}{f_1!(n-f_1)!}\right)^{t-1}$$

This proof by construction may be extended as follows: let w be a positive integer that divides R: n'=|R|/w. We can then view R as a concatenation of w substrings of size n' bits each. Each of those substrings may be treated as the arbitrary string R was treated above.

In fact there are $|K^1|$ keys that do the same, per each of the w substrings. Therefore it should be highly likely to find overlapping among the sections. We can compute the chance that a single key, K, will fit to decrypt an arbitrary bit string R to a BitFlip plaintext, comprised of w letters ($P_w$).

The number of keys per section is given above as $|K^1(n')|$. The chance $P_{n'}$ that a randomly selected key for alphabet A, and letter key size n' will be one that matches the decryption of a given section of R to a proper BitFlip letter is:

$$P_{n'} = \frac{|K^1(n')|}{(2^{n'} + n')^t}$$

And the chance that an arbitrary key will be fitting for all w sections is:

$$P_w = (P_n)^w$$

Clearly: $P_w \to 0$ for $w \to \infty$ which implies that for increasingly large random bit strings the smallest size key, K, that would decrypt them to a proper BitFlip plaintext is increasingly large. But it is always possible.

Taken from the opposite side: given a BitFlip cipher with a fixed alphabet, and a fixed letter key size; and given a confidence level $P_w$, there is a high limit of an arbitrary bit string that would be associated with a BitFlip key that would decrypt it to proper BitFlip plaintext.

We will combine this conclusion with the following lemma:

The Factorial Lemma:

If there exists a key, K that decrypts an arbitrary bit string R to a proper BitFlip plaintext, then there are corresponding t! keys, representing the t! permutations of assigning t letters keys to t letters.

Proof:

The key K matches the bits in R with the bits in each of the t n-size letter-key strings. The letter key strings are then matched each to a letter in the BitFlip alphabet. This matching can be done in t! ways, and therefore where there is one key that works there are corresponding t! keys that work as well.

This lemma leads to the fundamental conclusion of the "naive mode" of operating BitFlip: Every key has a computable $R_{equivocation}$ ciphertext size (and a matching plaintext size) such that any plaintext of smaller size is protected not just by the intractability of the cipher, but also by the expected equivocation thereto. (Note: in some publications equivocation is known through unicity distance).

This equivocation may be attacked with circumstantial knowledge, but not by further cryptanalysis of the captured ciphertext.

The second part of the fundamental conclusion of the naive mode of operation is that $R_{equivocation}$ may be increased by increasing the size of the key—indefinitely!

This latter conclusion suggests a key-reservoir strategy, whereby the communicating parties share a key-reservoir, and the transmitter, aware of the threat associated with a particular message will decide how large the active key should be for that message. It also suggests that the parties should aim to keep the size of their key secret, so that their attacker will never know whether the captured ciphertext is in the equivocation zone or outside it.

The other lesson from the above is that the naive mode of operation should be upgraded to more secure versions. Ahead we discuss three upgrading possibilities: (i) the letter frequency defense, (ii) parallel equivocation, and (iii) decoy strategy.

Operational Summary

1 Proposing a method for using a substitution cipher where each letter $a_i$ of the used alphabet A: $\{a_1, a_2 \ldots a_t\}$ is substituted with an n-bits long bit string, $c_i$, such that the Hamming distance between it and a secret n-bits string $k_i$ is a secret integer $f_i$ where $0 \le f_i \le n$: $H(c_i, k_i) = f_i$, and such that for all other letters $a_j$ in A where $a_i \ne a_j$ it holds that the Hamming distance between $c_i$ and $k_j$ is not equal to $f_j$, where $f_j$ is a secret integer, $0 \le f_j \le n$ associated with $a_j$, and $k_j$ is a secret n-bits long string representing $a_j$ in A: $H(c_i, k_j) \ne f_j$; the t strings $k_1, k_2, \ldots k_t$ together with the t integers $f_1, f_2 \ldots f_t$ comprise the secret cipher key.

2. Proposing a method for decrypting the string $c_i$ in claim 1 by evaluating the Hamming distances between it and all the t strings $k_1, k_2, \ldots k_t$; $H(c_i, k_j)$ j=1, 2, . . . t, and concluding that $c_i$ represents letter $a_i$ if, and only if, the Hamming distance between $c_i$ and $k_i$ is equal to $f_i$, $H(c_i, k_i)=f_i$, and the Hamming distances between $c_i$ and any other of the (t−1) strings $k_j$ for j=1, 2, . . . (i−1), (i+1), . . . t $H(c_i, k_j)$ is not equal to $f_j$; thereby allowing a reader with knowledge of the key: $k_1, k_2, \ldots k_t$ and $f_1, f_2 \ldots f_t$ to properly decrypt $c_i$ to $a_i$, while denying the same to anyone else.

3. Proposing a method to exploit the method in claim 1 for sending an n-bits long string, x, from a transmitter to an intended recipient such that a third party will regard that string as representing some letter from the A alphabet, while the intended recipient will properly evaluate this string as false and meaningless because either the Hamming distance between x and any $k_i$ is not equal to $f_i$, for any value of i=1, 2, . . . t, or there exists two or more letters $a_i$, and $a_j$ such that the Hamming distance between x and $k_i$ equals to $f_i$ and the Hamming distance between x and $k_j$ is equal to $f_j$ The Letter Frequency Defense The "factorial lemma" above stated that if there is one key that decrypts a BitFlip ciphertext to its corresponding plaintext then there are t! corresponding keys that also decrypt the same ciphertext to a proper BitFlip plaintext, where t is the number of letters in the BitFlip alphabet. This is serious source of equivocation. For an alphabet defined by Base64 symbols, the existence of a single BitFlip key will explode to: $64! = 1.27 \times 10^{89}$ proper keys.

Facing the "naive mode" an attacker will readily apply the historically well-known letter frequency cryptanalysis and very quickly resolve this equivocation. It is for that reason that the BitFlip user may opt to apply the "letter frequency defense" and safeguard this equivocation. It works as follows:

Given a BitFlip alphabet A comprised of t letters $a_1, a_2, \ldots a_t$, the user will add another letter, written as $a_0$ and regard it as the "separator letter". The separator letter will not be used to express the normal English or native language in which the plaintext is written. It will be applied on the plaintext written in the A alphabet by separating any repetition of the same letter. Say:

$$\ldots a_i a_i \ldots \rightarrow \ldots a_i a_0 a_i \ldots \text{ for } i=1,2,\ldots t$$

So applied for the entire plaintext, it will "kill all occurrences of letter repetition" and generate a "frequency ready" plaintext: $M \rightarrow M_f$. $M_f$ will have no letter repetition.

The frequency-ready plaintext will be preprocessed by a "frequency equalizer" by adding repetition to build a "frequency upgraded" plaintext where the frequency of all the letters is the same. Say:

$$a_i \rightarrow a_i a_i \ldots a_i \text{ for } i=1,2,\ldots t \text{ such that}$$
$$\text{count}(a_i)=\text{count}(a_j) \text{ for all } i,j=0,1,2 \ldots n$$

where count(x) is the number of occurrences of x in the frequency upgrades plaintext. The distribution of the repetition is also subject to randomization.

The "frequency upgraded" plaintext will then be forwarded to the BitFlip cipher to generate the corresponding ciphertext. Clearly the cryptanalyst of that plaintext will not draw any benefit from applying any frequency analysis since all the encrypted letters appear with the same frequency.

The intended recipient, on his part, will use the key to decrypt the ciphertext to the 'frequency upgraded' plaintext. It will feed it to the counter pre processor, ("the frequency eliminator") that would simply shrink all the letter repetition present in the input plaintext to generate the 'frequency ready' plaintext, and then the recipient would remove all the occurrences of letter $a_0$, ("the $a_0$-eliminator") to generate the original plaintext expressed in the A alphabet.

Even with even frequency of all letters in A, there is some leakage of knowledge, by the pattern of the letters. Low frequency letters that would be repeated sufficient times to equalize their distribution would tend to show up in clusters. To eliminate this leakage the cipher designer may add an ultimate transposition cipher (UTC) as a post processor of the output of the BitFlip cipher and thereby destroy the information-leaking pattern. See [Samid 2015] for a UTC.

For short messages there may be letters of A which are not part of the message, and hence cannot be directly repeated. To handle this situation the parties may agree that in an agreed position in the message there would be a special substring that carries no information, but rather lists all the letters absent in the message, so each letter can be duplicated sufficient time to insure equal distribution of all the letters in A. One can readily see how this strategy will totally eliminate the vulnerability to 'chosen plaintext' attack. Regardless of how many times, a given letter will be sent for encryption, the ciphertext will show all the letters in the alphabet in the same frequency.

Illustration: Let a transmitter wish to transmit the message $m_h$="Hey". Let the English letters be represented via an alphabet A defined as $\{a_1=X, a_2=Y, a_3=Z\}$, as follows: "H"='XXY', "e"='YZZ', "y"='XYX'. Accordingly, the English word "Hey" ($m_h$) would be written as: $m_a$='XXYYZZXYX'. We now eliminate all the letter repetition using the letter $a_0$='W', and construct the no-repetition plaintext: $m_0$='XWXYWYZWZXYX'. $m_0$ counts 4 letters X, 3 letters Y, 2 letters Z, 3 letters W. We now equalize the frequency of all the letters: adding 1 Y, 2 Z, 1 W: $m_e$='XWWXYWYZZZWZXYYX', where all the letters appear in the same frequency. We could submit $M_e$ to be BitFlip encrypted. Or, for extra security we could transpose $m_e$ using the UTC algorithm [Samid 2015] with transposition key $k_t$=211 and generate $m_t$=WXYZYXWZXYXWWZYZ. $m_t$ will be BitFlip encrypted to generate the corresponding ciphertext c. On the receiving end c will be decrypted to $m_t$, which will be reverse transposed to $m_e$. All the repetitions in $m_e$ will be eliminated to generate $m_0$. Next, all the $a_0$='W' letters will be removed to generate $m_a$, which will readily be converted to $m_h$="Hey".

Parallel Equivocation Strategy

An alphabet comprised of two letters is sufficient to express any message of any size. Therefore a BitFlip cipher with an alphabet A defined with t≥4 letters may be used to deliver two or more messages in parallel. Namely:

$$C=BFe(M_1(t_1),M_2(t_2) \ldots M_p(t_p),K)$$

Where C is the BitFlip ciphertext, $t_i$ is the subset of the t letters of the BitFlip alphabet that are used to encrypt message $M_i$, for i=1, 2, . . . p, and where $t=|t_1|+|t_2|+\ldots|t_p|$. Given the BitFlip key, K, one would decrypt the ciphertext to all its constituent messages:

$$M_i=BFd(C,K) \text{ for } i=1,2,\ldots p$$

This parallel encryption is of great interest because the key, K, is respectfully comprised of sub-keys: $K_1, K_2, \ldots K_p$, where each key $K_i$ will be comprised of the letter-keys for the letters in the subset $t_i$, and their respective flip ratios $f_i$—the set of flip ratios for the letters in subset $t_i$. We can say:

$$K=K_1+K_2+\ldots K_p$$

and the "parallel decryption algorithm":

$$M_i = BFd(C, K_i) \text{ for } i=1,2,\ldots p$$

This Parallel Decryption Algorithm formula is the basis for a variety of applications: (i) key switching procedure, (ii) terminal cryptanalytic equivocation, and (iii) document management.

Key Switching Procedure

The shared key, K, being comprised of p separable keys $K_1, K_2, \ldots K_p$ can be used with a switching schedule, accordingly the parties will switch from some $K_i$ to another key $K_j$ i≠j, per time lapsed, per shared event, per quantity of plaintext processed, per ad-hoc signal from transmitter to receiver, or a combination thereto. This will add a considerable cryptanalytic burden for the attacker. It is especially potent if used in combination with the terminal equivocation strategy.

Terminal Cryptanalytic Equivocation

Let $M_1$ be the secret message to be exchanged using BitFlip. Let $M_2, M_3 \ldots M_p$ be defined as a set of decoy messages such that $M_i \neq M_j$ for all i≠j. i,j,=1, 2, ... p. Let $E_0$ represent the entropy associated with the transmitted secret message $M_1$, as seen by an observer unaware of $M_1$. Let $E_1$ be the same entropy associated by an observer who is aware of $M_1$. Let's calibrate and agree that $E_1=0$.

Let $E_p$ be the above entropy as seen by an observer with knowledge of the set $M_1, M_2, \ldots M_p$, but with no indication whatsoever which of these p messages was the one actually transmitted.

The message transmitter would seek to identify (p-1) decoy messages: $M_2, M_3 \ldots M_p$ such that $E_p$ will be maximized.

Illustration: Let $M_1$="will meet you tomorrow at the bank". If the two decoy messages are: $M_2$="the sky is blue" and $M_3$="the grass is green", then the entropy associated with this set will be quite low, the probability of either decoy message to be the sent-message is small. Albeit if: $M_2$="if I see you tomorrow at the bank, the deal is off." and $M_3$="I think our code has been cracked, will find out tomorrow", then the relevant entropy is high. Each of the three messages would reasonably be the true one.

Once a good set of decoy messages has been identified, the transmitter would use them in the following protocol. (i) exchange an arbitrary subkey $K_i$ as the communication key. (ii) select values for all other keys $K_1, K_2, \ldots K_{i-1}, K_{i+1}, \ldots K_p$, (iii) Re-denote the p messages such that the true message $M_1$ is denoted as $M_i$ ($M_1 \rightarrow M_i$); encrypt $M_j$ with $K_j$, for j=1, 2, ... p, to generate the combined ciphertext C, which is to be transmitted.

The intended recipient of C would use $K_i$ to read the intended message $M_i$, and summarily ignore all other messages. The attacker may be held back by the intractability burden of cracking the messages, but if she is strong enough to negotiate the intractability defense, she will face the irreducible equivocation as to the identity of $M_i$ among the p contenders.

The effectiveness of this strategy is proportional to $E_p - E_1 = E_p$.

This strategy has two important features: (i) the selection of the decoy (p-1) keys and the (p-1) decoy messages is done unilaterally. The transmitter does not need to coordinate it with the recipient; (ii) the decoy messages may be of any desired length, each regardless of the length of the secret message.

There are several ways by which a transmitter may select 'good decoys'—that maximize $E_p$. It may be context-driven or context-free.

Context Free Decoy Selection:

There are several entropy infusing generic possibilities of note. For example: "This is a joke", "All the messages herein are nonsensical, it's a game", "all the numbers mentioned in these messages are false", "all the statements here are the opposite of what they are" or a different class "Alice loves Bob", "I predict an earthquake in San Francisco next year" etc.

Context Drive Selection

These can be derived manually by a person familiar with the situation at hand, or these can be derived using artificial intelligence tools that use the secret message as input and work out entropy-generating decoys.

To increase the efficiency of this strategy, the parties may combine this terminal equivocation procedure with key-switching. Accordingly the true key will be switched among the p possibilities according to some agreed schedule. This will prevent the attacker from learning, which is the right key by cumulatively analyzing the message traffic over the same key K.

Document Management

Document management is described in [Samid 2017], here it is in brief. The objective addressed by this method is as follows: A single document D, includes Data $D_0$, which is in the open, namely intended to be readable by any member of the class $R_0$ of readers, where $R_0$ is non-restrictive, everyone can be included. It also includes data $D_1$ which is restricted to a class $R_1$ of intended readers, and also data $D_2$, which is restricted to readers of class $R_2$ which is a subset of $R_1$: $R_2 \subset R_1$. Similarly the document D includes data $D_i$ which is intended to be read by members of the reading class $R_i$ where $R_i$ is a subset of $R_{i-1}$: $R_i \subset R_{i-1}$. for i=1, 2, ... p, and where the most restricted class of readers is $R_p$.

D can be encrypted using the Parallel Equivocation Method, by encrypting data $D_i$ by using key $K_i$ for a p-parallel messaging BitFlip cipher. Members of reading class $R_1$ will be given key $K_1$, members of reading class $R_2$ will be given $K_1$, and $K_2$, and in general for i=1, 2, ... p, members of reading class $R_i$ will be given keys $K_1, K_2, \ldots k_i$.

The above procedure will create a single version of the document D, kept and transmitted in its encrypted form, $D_{ciphertext}$. This single document will be exposed to each of its intended readers exactly according to their reading credentials. Each reader will be able to add and attach to this document, or write independently any document that is readable in a selective way by all the more restricted reading classes. It would be the writer of each add-on piece to the circulating document D who will decide for each part of his written document, what is its secrecy classification, and accordingly decide which of the keys in her possession $K_1$, $K_2, \ldots K_i$, should be used to encrypt which part of the document she writes.

The Decoy Strategy

The BitFlip cipher has the property of allowing the transmitter to unilaterally mix the transmitted message (the payload) with misleading information designed for no other purpose than to defeat a cryptanalyst (decoy). Decoy strategy may be regimented as we have seen with the parallel equivocation method but it can also be 'wild'. Namely, arbitrarily or randomly, to mix the message bits with decoy bits. The recipient of the combined stream will readily discard all 'letters' (bit string counting n bits, the size of the BitFlip letter keys), which don't satisfy the BitFlip interpretation terms, identified above. There are two possibilities of such failure to evaluate to a letter of the agreed upon alphabet. The substring either has not the right flip ratio $f_i$ relative to any letter of the alphabet: $a_1, a_2, \ldots a_i, \ldots a_t$, or it has a proper flip ratio to more than one letter in the alphabet. In both cases the incoming substring will be discarded. The transmitter decides unilaterally how many decoys to mix his message with, and how to carry out the mixing.

Decoys as such are not new. Rivest in 1998 [Rivest 1998] has published his "Winnowing and Chaffing" paper with similar strategy. The difference though is in speed and versatility. The BitFlip reader "winnows" much faster. Also, the BitFlip decoys may amount to a parallel message, or several of them. BitFlip decoys are at the letter by letter resolution.

With regard to the 'Naïve Mode' we have seen above that given an arbitrary bit string R, and a BitFlip key size $|K(t,n)|=|K|$, there is a computable probability $Pr[|R|,|K|]$ that a BitFlip key K would be found such that R would be decrypted to a proper plaintext M. Let the BitFlip key be of known size, $|K|$, then for an arbitrary bit-string U, of size $|U|=un$ bits, there is a probability $Pr[|K|,|U|]$ for the existence of a key K that will decrypt U to a proper BitFlip plaintext $M_u \neq$". (n is the size of the BitFlip letter key). For a given key, K, one can make U sufficiently short to increase $Pr[|K|,|U|]$ to exceed any threshold probability $\zeta_u \leq Pr[|K|, |U|]$.

The same analysis applies to any other size of plaintext message $M'_u \neq M_u$. And hence the "Naïve mode" BitFlip user will be able to answer the question what is the probability that for a given BitFlip key size, a random bit string R will decrypt to a proper plaintext message between the size of u' and u"?

Operationally this implies that a BitFlip message transmitter can unilaterally determine how many random bits to mix her message with, to create a target probability for decoy messages to arise and create a terminal cryptanalytic equivocation.

Managing Aging keys:

A BitFlip message transmitter may consider the 'worst case scenario' where an attacker follows and records all the messages transmitted with a given key, assuming the attacker knows that the key was not changed. The transmitter then may accumulate all the messages issued with the same key, $M_a$, and practice a decoy injection strategy that would (i) increase the intractability of cryptanalysis, and (ii) would generate sufficient equivocation.

Given an aging key, K, and a projection to have transmitted an accumulated plaintext of size $M_a$ at some future time $\theta$, $(M_a(\theta))$ then the transmitter would decide to inject decoy bits to insure an arbitrary chance $\zeta_{equivocation}$. The number of decoy letters, d that would generate that chance for equivocation is computable: $d=d(\zeta_{equivocation}, |K|, |M_a(\theta)|)$. $M_a$ will determine the size of the payload letters $(|M_a|)$, and the size of the combined BitFlip output string will be: $|R|=|M_a|+d$.

With time, as the BitFlip key ages, $M_a$ keeps growing, and the value of d keeps growing too. Say then that aging BitFlip keys, in order to maintain the security of their output, will have to pay with a growing and growing dilution. The more the key ages the larger the ratio between the equivocation required decoy letters $d_{equivocation}$, and the size of the accumulated message $M_a$. $d_{equivocation}/M_a(\theta) \to \infty$ for $\theta \to \infty$. Yet, there is no clear cutoff. Say then that a single BitFlip key may serve forever without any deterioration of its security, just paying with an ever larger dilution.

This analysis points one's attention to various key rotations and other key-switching techniques that would reduce the message dilution.

Encrypting Fingerprinted Data

Input in the form of fingerprinted data is most readily encrypted using a secret and large number of decoys. [Samid 2017B]. And if the bit identities are randomized then the increased decoy count with aging strategy will insure a Vernam-grade mathematical secrecy.

Let's analyze a simple case where a field sensor using a BitFlip cipher is sending off a specific measurement, ranges from a lower limit L to a higher limit H. The measurement data, x ($L \leq x \leq H$) is expressed via bit count, with the identities of the bits randomized. It will make no sense to encrypt this message using the "Naive Mode" because the size of the message will betray the value of x, regardless of the identities of the bits. However, adding a randomized number of decoys, or alternatively adding decoys so that the total size of the message would be a target size, T. With sufficient decoys the attacker will face full equivocation, x may assume any value between L and H.

It will be similar if the plaintext is combination of fingerprinted data and regularly expressed data. To perfect the equivocation the parties may agree on a ultimate transposition cipher as a BitFlip preprocessor.

Security Analysis of the Open-Ended Decoy Strategy

Intuitively one could maintain the security level of an aging BitFlip key by increased dilution. The more decoys surround and protect the message, the greater the security. This creates a 'deal' where security level is bought for the price of handling lot's of extraneous data. We now wish to formally analyze this intuition.

The ultimate security standard is the Vernam cipher, for which Claude Shannon proved that the message entropy facing a cryptanalyst who knows only the size $|c|$ of a ciphertext c, is the same as the entropy facing a cryptanalyst knowing the full identity of c. This is clearly not the case with BitFlip. Albeit, with enough decoys, the holder of a captured ciphertext c, will face a message entropy that is as large as the BitFlip key (which generally is much larger than a typical crypto key). This is the critical advantage of the decoy strategy over the 'naive mode' where as the ciphertext increases in size it wipes away any equivocation, and only the intractability defense remains. The decoy strategy can be extended to keep the message equivocation equal to the (large) size of the BitFlip key. Of course circumstantial evidence will decrease this ciphertext-based equivocation dramatically, but will not eliminate it. These results substantiate the intuitive sense that an aging BitFlip cipher will maintain its projected security indefinitely, using the extended decoy strategy.

We shall now prove the above assertions:

A "blind" cryptanalyst aware that a BitFlip cipher operated over a known alphabet A comprised of t letter, and of known key size $|K|$, has issued a ciphertext c of known size $|c|$ but unknown content| will face a set $M_b$ of possible messages, expressed as the "blind message space":

$$|M_b|=t^q+t^{q-1}+\ldots+t$$

where the ciphertext c, optionally padded with zeros so that $|c|=qt$, where n is the size of the BitFlip letter key, and q is the number of letters that comprise c.

Proof:

Let's consider an arbitrary message m comprised of p 'payload' letters, $p \leq q$: m: $m_1, m_2, \ldots, m_p$. Encrypted with the decoys strategy, the BitFlip cipher adds some d decoys to create a ciphertext c of size $|c|/t=q=p+d$. We shall now show that there exists a combination of a key K (of the known size |K|), and a ciphertext c such that m=BFD(c,K), and hence: c=BFE(m,K). (BFE and BFD are the BitFlip encryption and decryption algorithms respectively). This implies that all the messages of length 1 letter to length of q letters can be the encrypted message into an unknown ciphertext of size |c|, which is exactly what the "blind message space" expression claims.

To show the above we first select an arbitrary key K, and then we set c as follows. For the first p letters we set: $c_i$: $H(c_i, k_j)=f_j$, and insure that $H(c_i, k_j) \neq f_l$ for $l \neq j$, where $k_j$ is the letter key for letter $a_j$, which is indicated by $m_i$: $a_j=I(m_i)$. The remaining |c|-p letter we populate with $c_i$: $H(c_i, k_j) \neq f_j$ for j=1, 2, ... t, and i=p+1, p+2, ... p+d. Note that if there does not exist a cipher letter $c_i$ that meets the above demands then K is not a proper key.

Such construction will establish a ciphertext c of size |c| that decrypts to the arbitrary message m. And since the key was arbitrarily picked, it will work with every proper key. And since m is an arbitrary message m of size p letters where p≤q, it follows that the "blind message space" expression represents number of possible plaintext messages that satisfy the requirement that the size of the ciphertext will be |c|.

We shall now analyze the entropy facing an analyst who knows the content of ciphertext c.

We first introduce the "Random Decryption Lemma": given a BitFlip cipher with a key K(t,n) and an arbitrary bit string R, such that n divides R (R=nq), then there exists a plaintext message m written in the BitFlip cipher alphabet, such that m=BFD(R,K).

Proof:

Every substring of R comprised of n bits will either evaluate to a certain letter in alphabet A, or not. If not then it will be discarded, otherwise it will be concatenated to the growing decrypted list, m, comprised by order from the properly decrypted letters. When R is fully processed, the resultant m will constitute a proper plaintext message.

We now introduce the "Decryption Space Lemma:". Any arbitrary bit string R can be BitFlip decrypted to up to |K| plaintext messages, where, |K| is the size of the BitFlip cipher.

Proof:

Let $M_r$ be the set of all possible messages to which R can be BitFlip decrypted. No two such distinct messages can be decrypted using the same key K because, unlike the BitFlip encryption, the BitFlip decryption is a proper injective function. And since there are no more than |K| distinct keys we must conclude that $M_r \leq |K|$, which is what the lemma says.

To summarize, a "blind' cryptanalyst aware that a BitFlip ciphertext issued a ciphertext c, but aware only of |c|, not of c, will face a message space $M_b(q,t)$, while a "non-blind" cryptanalyst, aware of the content of c will face plaintext message space $M_c(t,n)$, where q=c/n. For some threshold value of q, and above we have:

$$M_b \geq M_c$$

$$t^q + t^{q-1} + \ldots + t \geq (2^n + n)^t$$

which implies that for ciphertext of a certain size and above, the blind cryptanalyst faces a greater entropy than the non-blind cryptanalyst. Or say, with BitFlip knowledge of the contents of the ciphertext has a clear cryptanalytic advantage, over just knowing its size. And hence, no matter how many decoys will be deployed, the projected security of the BitFlip ciphertext will not rise to the Vernam grade.

Nonetheless, we shall now prove that for a sufficiently long ciphertext (enough decoys) the corresponding message space facing the non-blind cryptanalyst is no less than the BitFlip key size, |K|. And since the BitFlip key size is enormous, this high message entropy will not be totally eliminated by any reasonable circumstantial evidence. What's more: there is little computational and cost penalty for increasing the size of the BitFlip key, to foster the equivocation at will. So while the BitFlip cipher does not rise to claim Vernam security, it does allow its user to upgrade its security with no preset sub-Vernam limit. In practice it implies that aging BitFlip keys can project a target security, and paying for it with increased message dilution.

We shall now prove this assertion, with the "Complete Decryption Theorem".

The Complete Decryption Theorem

A BitFlip cipher with a key K(t,n) is being used with the decoys strategy to generate a ciphertext c of size |c|. A cryptanalyst unaware of the contents of the key, only of its size |K| may opt for the brute force approach and try every possible key to decrypt the captured ciphertext c. The Decryption Space Lemma guarantees for the cryptanalyst that the number of message candidates so computed will be no more than |K|. But it is not clear how much smaller will this set of possible messages $M_e$ be compared to |K|. The smaller it is, the lower the entropy to be resolved.

We address this question with the 'complete decryption theorem' which states that for sufficiently long arbitrary bit string R the set of possible plaintext messages to which R can decrypt, $M_r$, will be the size of the key: $|M_r|=|K|$ for $|R| \rightarrow \infty$.

Proof:

Let $K_1$ and $K_2$ be two distinct BitFlip keys such that:

$$BFD(R,K_1)=BFD(R,K_2), \text{ for } K_1 \neq K_2$$

In that case we will have $|M_r|<|K|$. However, if we allow R to increase in size, and add n bits. The new ciphertext letter $c_{q+1}$, will likely interpret to two different letters for $K_1$ and $K_2$. If so then the two plaintext messages will no longer be the same:

$$BFD(R\|c_{q+1},K_1) \neq BFD(R\|c_{q+1},K_2).$$

And if by chance the two plaintext messages are still the same than by adding another ciphertext letter (n more random bits) to R, or two more, the plaintext messages will be diverge. In other words after adding jn bits to R, we will have:

$$BFD(R\|c_{q+1}\| \ldots c_{q+j},K_1) \neq BFD(R\|c_{q+1}\| \ldots c_{q+j},K_2)$$

This strategy of "addition until diversion" can be practiced until the two formerly identical plaintext messages each has a different terminal letter. This fact will guarantee that however larger R will become these two messages will never be identical again.

The same applies to any pair of identical plaintext messages. It is possible that such adding of bits to R will create new similar pairs of plaintext messages. But should this happen then, adding yet more random bits to R will 'cure' this identity as described above. And since any two "cured" pair of identities will never be identical again no matter how many more random bits are added, then it is clear that the finite plaintext messages, $M_r$, will eventually all be distinct and we will have $|M_r|=|K|$ as claimed.

This proof supports the claim that an extended application of the BitFlip decoy strategy would insure a message space of candidates messages that is as large the BitFlip key.

Message Size Distribution

Given a BitFlip cipher, and a bit string R comprised of r=nq bits, where n is the letter-key bit size, one could decrypt R with any one of the keys in the key space |K|. Some p letters in R will decrypt to particular letters of the BitFlip alphabet, and the rest d=q−p will be discarded. We have seen that for sufficiently large R there will be |K| distinct plaintext messages resulting from this procedure. In general |K|>>q, and hence one would necessary expect a distribution, there will be h(p) plaintext messages of size p letters, such that:

$$M_r = \sum_{i=1}^{i=q} h(i) \leq |K|$$

This distribution will identify the most popular message lengths in this set. These are the messages that are most likely to supply the terminally equivocated results because they will include many highly plausible messages (especially the shorter ones). The real message may fit the most popular size. This serves as a user guide to determine how many decoys are needed to secure a given plaintext message. See FIG. 3

General Security Considerations

We complete the security analysis with some special considerations:

Post Quantum Status

BitFlip threat adjustability endows it with a good defense status vis-à-vis a quantum cryptanalyst. Its equivocation defense is immunized to quantum attack, and its intractability defense is easily upgraded by simply increasing the BitFlip key size. It is an increase, which is carried out with little penalty in terms of computational burden and execution cost. BitFlip security is not based on complex algorithms where quantum computers dissolve their complexity. It is based on the new technology of quantum grade randomness. Using BitFlip one fights quantum with quantum.

Side Channel Attacks:

BitFlip encryption and decryption computation is equally distributed among the various letters that are being encrypted or decrypted. And as such it does surrender to side channel attack the way complex arithmetic ciphers do.

Takeover Threat:

The simplicity of BitFlip processing invites a dedicated bit-count and bit-flip hardware design. The resultant chip will be tightly tailored to its purpose and unfit for the increasingly common takeovers suffered by general purpose computing devices.

AI Readiness

We present here a novel approach to cryptographic strategy: a new flexibility. The communicating parties share a reservoir of randomness, the "Key Reservoir," the allocation of which is left for subsequent algorithmic dynamic decision in response to the prevailing threat. The parties also share several alphabets of various sizes, and also share operational primitives: the BitFlip encryption and decryption modules, a transposition module, letter-frequency defense modules, and parallel-encryption modules. These resources are governed by a cryptographic security controller. Another critical resource for each party is the unshared high-quality randomness generator. All the shared resources can be dynamically refreshed, except the shared randomness reservoir, which is limited to what was a-priori shared between the parties. In particular the cryptographic controller will be upgraded with the latest AI capabilities applied to optimal tailoring of the projected security to the threat at hand, and to smart selection of decoy messaging.

The concept of threat-adjusting security, exercised through smarter and smarter AI, is a foundation of a broad scope of applications and operational flexibility. For example, some secure communications may have a short lifespan, namely exposing them a while later is of no harm. As is the case, with some money transfers. Such communications can be carried out via ad-hoc keys that were exchanged at proper level of security on the basis of the shared key reservoir.

Zero-Leakage Communication

Two communication parties may enter into a zero-leakage mode as follows. Each party will use the BitFlip cipher to send the other a fixed rate stream of decoys (rate of r bits/sec). The two counter streams will keep sending random bits one to the other without any content communication. The recipient party will evaluate the incoming stream, find all the data to be decoy, and will discard it. At a given point of time one party may develop a need to send a message m to the other. In that case the transmitter would randomly spread the message letters (in their ciphertext mode) within the random bits, while maintaining the r bits/sec output flow. In essence it means to replace decoy letters with proper letters. The response will be sent in the same mode, using the counterflow of random bits. That way the parties will be communicating with each other while leaking no information as to the extent and the characteristics of their communication (frequency, message length, dialogue v. monologue, etc.). They will not even leak the fact that they communicate at all. The limit of the communication in terms of rate is determined by the random flow rate of r bits/sec, but that rate is set at will.

This mode is especially important in situations where the starting of a conversation is very indicative to an adversary. One side-effect of this zero-leakage mode is that it overloads and exhausts the cryptanalytic capacity of the adversary who is spinning its wheels, so to speak, trying to crack pure randomness.

It is the ability to fast discriminate between proper data and decoys that powers this zero leakage operational mode.

Operational Description

Zero leakage communication amounts to a method where two parties, each sending the other a constant bit flow, comprised of concatenated n-bits long strings $c_1, c_2, \ldots$ such that all the communicated strings are evaluated to no letters of alphabet A, for the case where no party wishes to send information to the other, and such that some of these strings do evaluate to letters in A, such that the sequence of the properly evaluated letters will comprise the message the transmitter intended to send to the intended recipient while embedding it in the constant bit flow comprised of the message and the non-information bearing bits.

Communication Architecture

We outline here the construction of the BitFlip setup that exploits the threat-adjustability described herein.

The elements to deal with are (i) the transmitter, (ii) the recipient, (iii) the message to be transmitted, and (iv) the threat that drives the entire security apparatus. In reality the communicating parties will run a dialogue and the role of transmitter and recipient will be switch-able.

Before the parties enter into a threat sphere, they conduct a priming operation, in a secure mode in which they exchange (i) a key reservoir, and (ii) a set of shared parameters, which include (a) a list of possible alphabets, (b) transposition parameters for optional use of transposition module.

The key reservoir is comprised of a rather large quantity of highly randomized bits. The allocation of these bits to key letters and flip-ratios, and to replacement keys is left to be determined by the parties as they operate under a dynamic threat.

Once the priming is concluded, the parties enter into the threat-driven secure communication mode. While there, at some arbitrary time, the transmitter generates a need to securely communicate some message m to the recipient. To do that the transmitter conducts a 'threat evaluation'. The details and the nature of this evaluation is an extraneous matter to our concern here. We need to be able to respond to various levels of threat as determined by this threat-evaluation stage. The idea of this construction is to plan a matching security that would be adjusted to meet the perceived threat. The determined threat level is fed into the BitFlip Security Planning functional block. This function takes as input (i) the threat assessment, and (ii) the message sensitivity. This is an assessment of the damage to be sustained if this message is compromised. These two parameters lead the built-in smart software to plan a fitting security. This planning involves coordinated parameters and unilateral parameters.

The coordinated parameters include (i) identification of one or more alphabets to be used for this message. A message is comprised of some very sensitive and some less sensitive parts that may be encrypted using two different alphabets. The parties must coordinate which alphabet is used for which part of the message. They must also coordinate how to allocate the randomness in the shared key-reservoir for the purpose of this message. In addition the parties must agree on using add-on features like the letter frequency defense, and the transposition module.

One of the strong attributes of BitFlip is that a great deal of the projected security can be determined unilaterally by the transmitter, without any prior coordination with the recipient. In particular the transmitter will come up with a proper decoy strategy that matches the prevailing threat and the message sensitivity. This strategy will determine (i) whether to use randomized decoys or (ii) use a full decoy message by applying the parallel encryption procedure. In case of randomized decoys, their count and distribution will have to be determined either deterministically or through the local randomness source. The basic idea is a trade-off between security and message dilution. We have shown that the transmitter has the power to maintain a desired high level security of the encrypted messages by simply mixing in more and more decoys. This creates a greater and greater dilution, namely a lower ratio between content and bit flow volume. It is up to the transmitter unilaterally to determine the desired trade off.

The recipient will simply pass the incoming ciphertext via the decryption function. Using the same alphabet and same key, the recipient will discard all the ciphertext bits that don't evaluate to a single letter in the used alphabet, and sequentially log the bits strings that do evaluate to a proper letter. When the ciphertext is fully processed, the transmitted plaintext message is ready to be read.

Bitflip Authentication Methodology

Communicating parties will cross-authenticate themselves to each other by sending on demand of the other party, an authentication string, A, comprised of n bits, which has a secret Hamming distance value s relative to a secret key, K: $H(A,K)=s$. The recipient party will authenticate the transmitting party if this Hamming condition is met, but only if the "non-repeat condition" is also met. The non-repeat condition relates to all the previous authentication strings $A_1, A_2, \ldots A_p$ that were exchanged between the parties since this particular protocol was set in action; regardless of who was the transmitter and who was the recipient for any authentication string. The parties will agree on a "proximity distance", d, and evaluate any new authentication string A vis-a-vis all the previous p strings. For A to pass the "non-repeat condition" it is necessary that the Hamming distance between A and each of the p previous authentication strings will be greater then d: $H(A,A_i)>d$ for $i=1, 2, \ldots p$.

A transmitter preparing an authentication string A (A-candidate) will employ a randomization process to flip s bits in K. Then the transmitter will check the Hamming distance between this A candidate and all the previous p authentication strings. If for any of the previous authentication strings the Hamming distance versus the A candidate is d or less, then this A-candidate will be disqualified, and the randomization process to flip s bits in K will be re-invoked. This re-invocation will be repeated, until the "non-repeat condition" is met.

The parties will have to choose a secret key K of sufficient length in order to make it sufficiently likely for a randomly generated A candidate to pass the "non-repeat condition".

The non-repeat condition is levied in order to frustrate attackers who trace and capture all the authentication strings that transpired in the past and then try to repeat them, either exactly, or with minor changes, in hope to fool the recipient into false authentication.

This protocol is valid only for situations where the transmitter and the recipient are the only parties to the communication arrangement that relies on the shared secrets K and s. If there are more than two parties, then the transmitter may not be aware of authentication strings used between its recipient and another transmitter. So the transmitter will not be able to insure compliance with the "non-repeat condition". In that case it will only be the recipient that evaluates the "non repeat condition" relative to all the authentication strings it used, regardless of who transmitted them. In case that some transmitter sends an authentication string that does not pass the "non repeat test" then the recipient will instruct the transmitter to send another authentication string. This "try again with another string" step will be repeated until either the "non repeat condition" is met, or the A string does not pass the Hamming distance test versus the secrets K and d.

For security reasons it is best if every party in a multi-party shared authentication protocol will have its own authentication secret K, so that that party is aware of all the strings used for authentication based on that K. Say then that if three parties X, Y, Z comprise a multi-party shared authentication set then the three will share three authentication secrets $K_x$ and $s_x$ for X, $K_y$ and $s_y$ for Y, and $K_z$ and $s_z$ for Z. When either Y or Z will wish to authenticate themselves to X they will generate an authentication string A which is $s_x$ bits randomly flipped in $K_x$.

Operational Summary

BitFlip authentication is essentially a method based on the basic BitFlip randomization process where a set of transmitting parties will authenticate themselves to a recipient party R by relying on a shared secret comprised of an n-bits long string K and an integer $s \leq n$, and whereby a transmitting party will randomly flip s bits in K to generate an authentication candidate string A, and then send the A candidate string to recipient R, for R to evaluate (i) that the Hamming distance between the A-candidate and K is s, and (ii) that the Hamming distance between the A-candidate and each and every authentication string used previously, is larger than a threshold distance d; failing either test the recipient R will reject the A-candidate and instruct the transmitter to try with another A-candidate, and try again, until both tests (i, ii) for authentication are satisfied.

What is claimed is:

1. A method for secret communication and for mutual authentication among transmitting parties belonging to a secret-sharing group, wherein a secret communication of a message M written in an alphabet A comprised of t letters: $\{a_1, a_2, \ldots a_t\}$ where transmitting party and recipient party share a secret key K comprised of t bit strings $k_1, k_2, \ldots k_t$ each comprised of n bits, and t positive integers $f_1, f_2, \ldots f_t$ where $0 \leq f_i \leq n$, for $i=1, 2, \ldots t$, and where the transmitting party transmits the q letters in M in sequence $m_1, m_2, \ldots m_j, \ldots m_q$ letter by letter such that letter $m_j$ ($j=1, 2, \ldots q$) written as letter $a_i$ of the alphabet A is communicated to the recipient by the transmitter sending to the recipient string $c_j$ which is generated by a flip action defined as flipping $f_i$ bits in $k_i$, then conducting a no equivocation test where one tests that for all $l \neq i$ the Hamming distance between $c_j$ and $k_l$ is not equal to $f_l$;

if the test fails the transmitting party repeats the flip action with different choice of $f_i$ bits to flip, then conducting the "no equivocation test" on the new output string of the flip action, $c_j$, and repeating this loop until the no equivocation test does not fail, in which case $c_j$ is transmitted to the recipient party;

repeating the same for $j=1, 2 \ldots q$ the entire message M is transmitted to the recipient party, and where the recipient party, receiving the sequence $c_1, c_2, \ldots c_j, \ldots c_q$, is extracting the corresponding value of $a_i$ for each $c_j$ by finding for each $c_j$ for $j=1, 2, \ldots q$ the letter $a_i$ where the corresponding string $k_i$ has a Hamming distance $f_i$ with $c_j$, while for all $l \neq i$ the Hamming distance between $c_j$ and $k_l$ is not equal to $f_l$, and where any party in the secret-sharing group will authenticate itself to any other party in the secret-sharing group, regarded as an authenticator, where the party to be authenticated is regarded as an authentication-candidate, and where all parties in the secret-sharing group share a secret comprised of an n-bits long string $K_a$ and a secret integer $s \leq n$, and whereby the authentication candidate will randomly flip s bits in $K_a$ to generate an authentication candidate string R, and then send the R candidate string to the authenticator to evaluate (i) that the Hamming distance between R and $K_a$ is s, $H(R,K_a)=s$, and (ii) that the Hamming distance between R and each and every authentication string used previously, is larger than a threshold distance d; failing either test the authenticator will reject R as a proof of the identity of the authentication candidate, and then the authenticator will instruct the authentication candidate to try with another, candidate string, R', and try again, until both tests (i, ii) for authentication are satisfied.

2. The method of claim 1, to immerse a message M in a larger bit stream L by the transmitting party sending to the recipient party a false letters comprised of n bits strings, x, where the Hamming distance between x and $k_i$ for $i=1, 2, \ldots t$ is not equal to $f_i$, or there are at least two letters $a_i$ and $a_j$ in A for which the Hamming distance between x and $k_i$ is equal to $f_i$, and the Hamming distance between x and $k_j$ is equal to $f_j$;

the recipient party, following the protocol in claim 1, will not be able to evaluate x to any letter in A, and conclude x to be the false letters; any party outside the secret-sharing group will regard that string as representing some letter from the A alphabet.

\* \* \* \* \*